United States Patent
Alguera Gallego et al.

(10) Patent No.: US 6,513,783 B1
(45) Date of Patent: Feb. 4, 2003

(54) SUPPORT FOOT

(75) Inventors: José Manuel Alguera Gallego, Aschaffenburg (DE); Gerald Muller, Obertschausen (DE); Steffen Pfister, Langen (DE)

(73) Assignee: Jost-Werke GmbH & Co. KG., Frankfurt am Main (DE)

( * ) Notice: Subject to any disclaimer, the term of this patent is extended or adjusted under 35 U.S.C. 154(b) by 0 days.

(21) Appl. No.: 09/786,042

(22) PCT Filed: Aug. 28, 1999

(86) PCT No.: PCT/EP99/06337
§ 371 (c)(1),
(2), (4) Date: May 18, 2001

(87) PCT Pub. No.: WO00/12363
PCT Pub. Date: Mar. 9, 2000

(30) Foreign Application Priority Data

Aug. 28, 1998 (DE) .......................... 198 39 360

(51) Int. Cl.⁷ .................................. B60S 9/00
(52) U.S. Cl. ................ 248/677; 248/188.1; 248/188.8; 248/188.9; 280/763.1
(58) Field of Search ................. 248/615, 632, 248/677, 188.8, 188.1, 188.9; 280/763.1, 475

(56) References Cited

U.S. PATENT DOCUMENTS

| | | | |
|---|---|---|---|
| 3,666,290 A | * 5/1972 | Dalton et al. ............ | 280/763.1 |
| 4,039,206 A | 8/1977 | Nault | |
| 4,176,825 A | 12/1979 | Schwebke | |
| 4,462,612 A | * 7/1984 | Dreyer et al. ............ | 280/766.1 |
| 4,634,144 A | * 1/1987 | Ringe ...................... | 280/763.1 |
| 4,903,977 A | * 2/1990 | Baxter ...................... | 280/475 |
| 5,054,805 A | * 10/1991 | Hungerink et al. ......... | 280/475 |
| 5,426,961 A | * 6/1995 | Rimbaud et al. ............ | 70/237 |

FOREIGN PATENT DOCUMENTS

| | | |
|---|---|---|
| DE | 31 19 359 | 12/1982 |
| EP | 0 322 634 | 7/1989 |
| EP | 0 430 643 | 6/1991 |

* cited by examiner

Primary Examiner—Leslie A. Braun
Assistant Examiner—Deborah M. Brann
(74) Attorney, Agent, or Firm—Hudak, Shunk & Farine Co. LPA

(57) ABSTRACT

The invention relates to a support foot, which is equipped with a damping element and which exhibits an improved pivotability. The fixing element which is provided for pivotally fastening to a foot receiving device rests on the damping element or is fastened to the same, whereby the fixing element is held by a bracket which is fastened to the foot plate and which overlaps the fixing element. According to another embodiment, the fixing element is comprised of two vertical plates fastened to the foot plate at a distance from the damping element, whereby each plate comprises a vertically arranged, longitudinal hole or a round hole having a diameter larger than the diameter of the bearing element.

3 Claims, 2 Drawing Sheets

SUPPORT FOOT

FIELD OF THE INVENTION

The invention relates to a support foot for support devices for semi-trailers with a foot plate, a damping element arranged on the foot plate and a fixing element with two holes for receiving at least one bearing element for pivotable fastening to a foot receiving device of the support device. An example of such a support foot is available in the EP-A-0430 643.

Support devices are, as a rule, arranged in pairs in the front areas of the underside of semi-trailers and are always used when the semi-trailer is separated from its semi and parked. With air-spring semi-trailers it is, however, known that after a more-or-less extended period left standing, air leaks out of the springs, with the consequence that the rear end of the trailer wagon drops, so that it assumes an inclined and/or backward tilting position with regard to the ground. This is why the support feet and/or their footplates must be arranged to be pivotable, in order to even out this tilted position. The same is also true when the semi-trailer is parked on uneven surfaces. In addition to the pivoting ability of the foot and/or the footplate, it is desirable to set down the moving parts of the support device gently onto the ground while retracting the support devices, in order to avoid any damage. To this end, corresponding damping elements have been provided in the support feet.

Since it is very difficult to satisfy all these constraints with only one foot embodiment, different foot variations are generally used according to the conditions of use.

The necessary embodiment of the foot must usually be decided before the purchase of the support jack, since the foot is a part of the jack and is correspondingly mounted on it.

The differing embodiment of the foot mostly also determines different precautions and preliminary work stages on the support jack itself. This yields a specific embodiment of the support jack for each type of foot at the time.

The advantage in this is that the foot and the support jack can be optimally balanced with each other.

There are, however, also significant disadvantages.

This way, many different kinds of work must be carried out in the manufacturing process of the support jack for each type of foot, with corresponding expenditures for tools, devices, material supplies, space requirements and logistics.

In addition, the final consumer or the middleman usually no longer has the option of interchanging different types of feet with each other, following the manufacture of the support jack.

It is, therefore, worthwhile to develop types of feet that are as versatile as possible and, accordingly, have a wide range of applications.

The current status of technology includes a foot embodiment, hereinafter referred to as a disk foot. This foot is a rigid shape that has a disk-shaped standing surface and which is able to pivot around an axis located in the inside pipe of the support jack in a position horizontal and diagonal to the traveling direction. Thus the foot is able to adjust to certain inclinations of the roadway, such as entrance ramps, upward inclines, etc. and thus facilitate parking the trailer.

Through the rather rigid embodiment of the foot, however, impact loads, such as those arising, for example, while shunting the trailer, are directly transferred to the support jack and also immediately to the vehicle. This can lead to functional disturbances or even damage to both over time.

In order to reduce or even avoid such damage, there are foot types that have elastic elements that absorb the kinematic energy of the impact and should therefore protect the mechanical components.

BACKGROUND OF THE INVENTION

A support device is known from the DE-OS 31 19 359, on which a bottom plate is provided, overlapping on its side at the lower end of the retractable support part of this protective piece, through which a rubber compression body is arranged between these bottom plates and the foot plate. A holding ring welded to the foot plate overlaps the ring-shaped part of the bottom plate standing to the side with an upper edge segment, allowing a certain amount of play between the holding ring and the retractable support part. The pivoting elbow joint and spring path of the foot plate is limited here by the compressibility of the elastic compression body and the distance between the holding ring and the retractable support piece. This construction only allows limited adjustment of the footplate to greater unevenness of the ground.

SUMMARY OF THE INVENTION

It is the challenge of the invention to create a support foot in the manner described above, which is connected to the support device and is supported on the support device by means of a damping element, and which is easily adjustable to different support devices with adequate damping and pivoting ability.

To meet this challenge the fixing element rests on or is fastened to the damping element, whereby the fixing element is held by a bracket fastened to the footplate and overlapping the fixing element.

In its unloaded condition, the footplate hangs on the bracket on the fixing element, and the damping element is not compressed. The fixing element is located between the damping element and this bracket. When the support foot lands on the ground the fixing element is released from the bracket and compresses the damping element. The fixing element does not need to be able to pivot in the area of the damping element, because the pivoting suspension of the fixing element is provided on the foot-receiving device of the support device.

In particular, the fixing element is a U-shaped component with two legs pointed vertically upward, so that both legs line up with both holes for receiving the bearing element for the pivoting suspension. The pivoting suspension and damping element are arranged one above the other and are completely disconnected, so that both movements neither influence nor impede each other.

In particular, two stops are attached on the footplate under the fixing element, so as to limit movement of the fixing element. These stops are helpful in protecting the damping element from excessive loads.

DETAILED DESCRIPTION OF THE INVENTION

Figure 1:
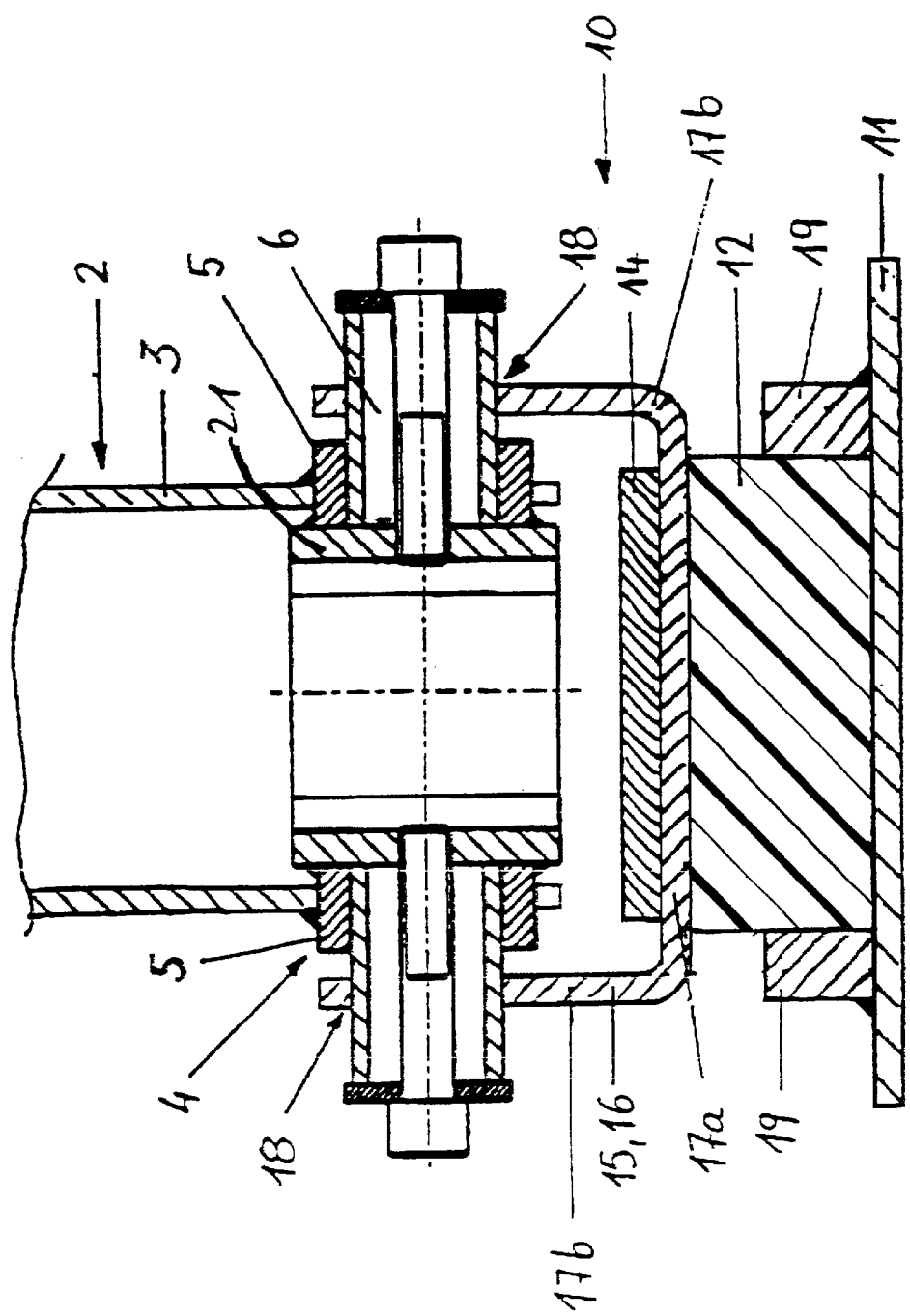
FIG. 1 Embodiment of a support foot, vertical, cross-sectional view.

In FIG. 1, the lower end of the support device 2 is shown. On the inside collar 3 on the lower end there is a foot receiving device 4 with a pipe-shaped, vertically aligned central body 21, on which horizontally aligned sleeves 5, overlapping on their sides, and the bearing elements are attached in the form of bearing pipe segments 6. A U-shaped component 16 is arranged to be able to pivot at these bearing pipe segments 6, which forms the fixing element 15 for the support foot 10.

Figure 2:
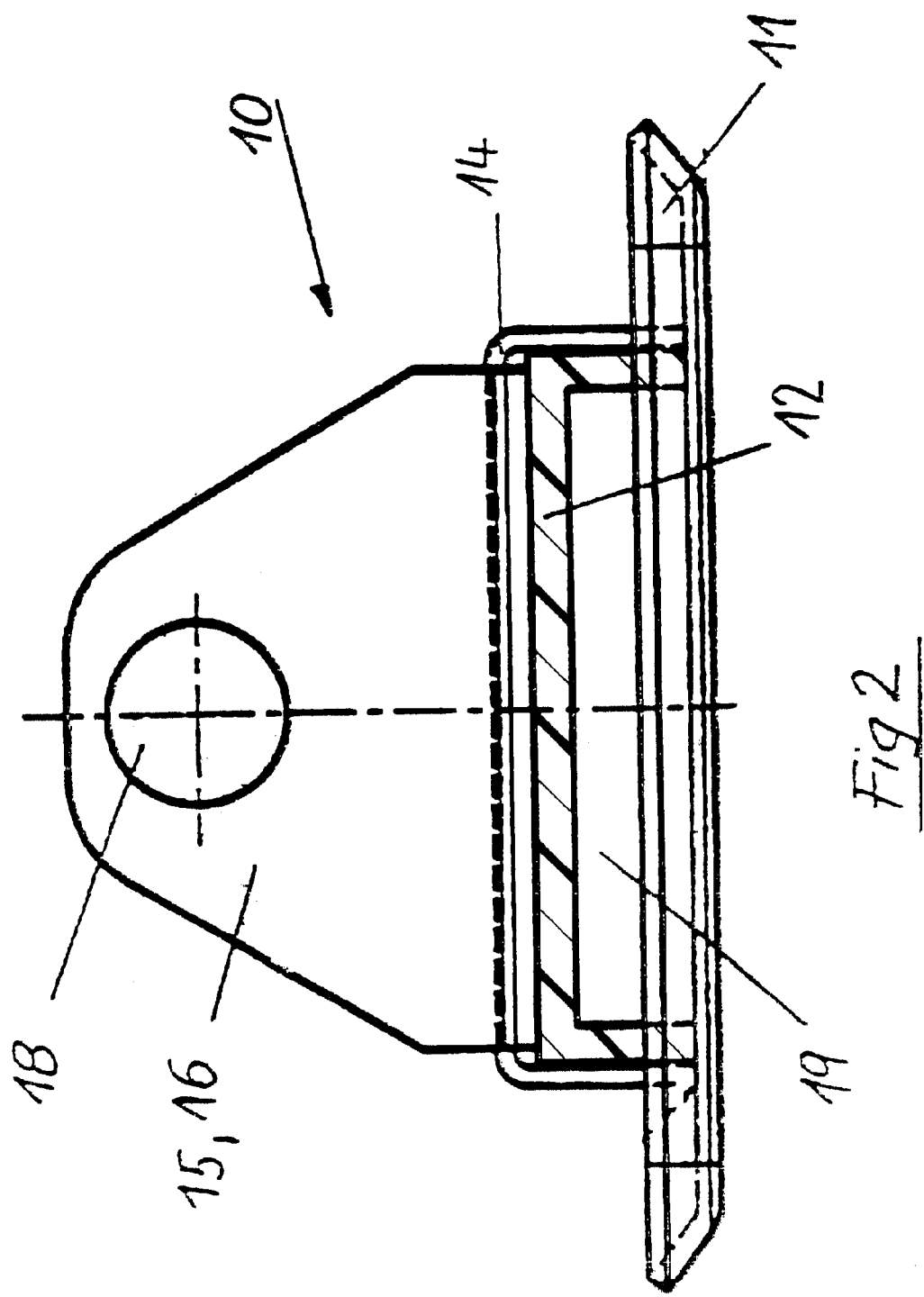
FIG. 2 Support foot, as shown in FIG. 1, side view.

The U-shaped component 16 features a horizontally arranged middle piece 17a and two vertical, rising legs 17b. In the legs 17b, holes 18 are arranged for reaching the bearing pipe segment 6. The fixing element 15 rests on the damping element 12 and is overlapped by a bracket 14, which, as indicated in FIG. 2, is fastened to the top side of the foot plate 11.

In touching down the support foot 10, the fixing element 15 moves down and thus compresses the damping element 12. The middle piece 17a is then released from the bracket 14. To limit movement on the side of the damping element 12, two stops 19 are arranged on the footplate 11, which supports the fixing element 15 under extreme load. Vertical movement is guaranteed by the damping element 12 and, independent of this, the pivoting ability is ensured by the embodiment of the U-shaped component, in connection with the foot receiving device 4.

REFERENCE SIGNS

2 Support device
3 Inside collar
4 Foot receiving device
5 Sleeve
6 Bearing pipe segment, Bearing element
10 Support foot
11 Foot plate
12 Damping element
13 Connection plate
14 Bracket
15 Fixing element
16 U-shaped component
17a Middle piece
17b Leg
18 Hole
19 Stop
21 Pipe-shaped central body

What is claimed is:

1. A support foot, for a support device of a semi-trailer comprising:

a foot plate;

a damping element arranged on the foot plate; and a fixing element with two holes receiving at least one bearing element adapted for pivotable fastening to a foot receiving device of the support device, wherein the fixing element either rests upon the damping element or is attached thereto, so that the fixing element is held by a bracket fastened to the footplate and overlapping the fixing element.

2. The support foot according to claim 1, wherein the fixing element is a U-shaped component with two vertical upward pointing legs, and wherein both legs match both holes for receiving the bearing element.

3. The support foot according to claim 1, wherein two stops are fastened to the footplate under the fixing element, so as to limit movement of the fixing element.

* * * * *